(12) United States Patent
Wang et al.

(10) Patent No.: US 7,169,733 B2
(45) Date of Patent: Jan. 30, 2007

(54) VISIBLE LIGHT-INDUCED PHOTOCATALYST

(75) Inventors: Chih-Kuang Wang, Kaohsiung (TW); Fu-Yin Hsu, Taipei (TW); Shan-Chang Chueh, Taipei (TW); Jiunn-Woei Liaw, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 631 days.

(21) Appl. No.: 10/747,463

(22) Filed: Dec. 29, 2003

(65) Prior Publication Data

US 2004/0144416 A1    Jul. 29, 2004

(30) Foreign Application Priority Data

Dec. 31, 2002  (CN) ................. 91 1 38096
Nov. 5, 2003   (CN) ................. 92 1 30897

(51) Int. Cl.
*B01J 23/00*     (2006.01)

(52) U.S. Cl. ...................... 502/300; 502/350
(58) Field of Classification Search ............... 502/300, 502/350

See application file for complete search history.

(56) References Cited

U.S. PATENT DOCUMENTS

| | | | | |
|---|---|---|---|---|
| 5,698,177 A | * | 12/1997 | Pratsinis et al. | ............. 423/613 |
| 6,602,607 B2 | * | 8/2003 | Rengakuji et al. | .......... 428/432 |
| 6,830,741 B1 | * | 12/2004 | Sakatani et al. | ............. 423/610 |
| 6,908,881 B1 | * | 6/2005 | Sugihara | ..................... 502/350 |
| 7,011,808 B2 | * | 3/2006 | Sakatani et al. | ............. 423/610 |
| 7,033,566 B2 | * | 4/2006 | Arakawa et al. | ............. 423/595 |

\* cited by examiner

*Primary Examiner*—Evan Pert
(74) *Attorney, Agent, or Firm*—Thomas, Kayden, Horstemeyer & Risley (57) ABSTRACT

A visible light induced, highly oxidative, and highly reductive photocatalyst. The photocatalyst includes a first semiconductor with a bandgap between valence band and conduction band thereof between 2.0 eV and 3.0 eV, and second semiconductor, combined with the first semiconductor, with a bandgap between valence band and conduction band thereof between 2.0 eV and 3.0 eV. The conduction band of the first semiconductor is negative relative to that of $H_2/H_2O$ with a difference of 0.2 eV or greater. The valence band of the second semiconductor is positive relative to that of $H_2/H_2O$ with a difference of 2.8 eV or greater.

20 Claims, 3 Drawing Sheets

VISIBLE LIGHT-INDUCED PHOTOCATALYST

BACKGROUND OF THE INVENTION

1. Field of the Invention

The present invention relates to a photocatalyst inducing oxidation and reduction under visible light, and more specifically to a photocatalyst that is highly activated, visible light induced, highly oxidative, and highly reductive.

2. Description of the Related Art

Atoms of a semiconductor are bonded by covalent bonding with a bandgap between valence and conduction bands. When the semiconductor is irradiated and the energy of the incident beam equals that of the bandgap or greater, electrons in the valence band are excited and transit to the conduction band, leaving holes in the valence band, thereby forming electron-hole pairs. Thus, the semiconductor can be a photocatalyst, wherein the excited electrons may be captured by electron acceptors of adsorption molecules to reduce the adsorption molecules, and/or the holes may capture electrons of adsorption molecules to oxidize the adsorption molecules in the lifetime of the electron-hole pairs. The redox potential of the adsorption molecules and potentials of valence band and conduction band of the photocatalyst determine whether and how the redox reaction occurs.

Fujishima et al. disclose a wet type photocell with a $TiO_2$ electrode oxidizing water and generating oxygen under light irradiation in Japanese Patent Issue No.0633127. $TiO_2$ becomes the most popular photocatalyst resulting from the properties thereof such as low water-solubility, high stability, non-toxicity, and low cost after this disclosure. The oxidation of water in the surface of photocatalyst such as $TiO_2$ is shown in subsequent reactions.

The final product, hydroxyl free radicals (.OH), can react with and remove toxic contaminants.

However, bandgap of commercially used $TiO_2$, Degussa P-25 type, is 3.2 eV, resulting a requirement for irradiation under light with energy of 3.2 eV or greater to form electron-hole pairs to induce the redox reaction. Wavelength of light with energy of 3.2 eV or greater is 387 nm or less, in the UV range. In solar energy normally received at sea level, only 5% is UV, 45% is visible light (wavelength between 400 nm and 800 nm), and 50% is IR. Thus, a visible light-induced photocatalyst is required to use the received solar energy effectively for photocatalyst application in low light environments such as in cars and indoors.

Anpo et al. disclose a photocatalyst of doped ionized metal, such as vanadium or chromium, in a $TiO_2$ photocatalyst as disclosed in Japanese Patent Publication No.JP 9262482. The dopants replace parts of titanium ions in the $TiO_2$ crystals, inducing energy bands lower than the conduction band of $TiO_2$, thereby lowering the bandgap of the metal-doped $TiO_2$ photocatalyst to approximately 2.0 eV. Thus, the electrons of the metal-doped $TiO_2$ photocatalyst can be excited by irradiation using light having approximately 620 nm wavelength of visible light to form electron-hole pairs.

Morikawa et al. disclose a photocatalyst of doped ionized nitrogen in a $TiO_2$ photocatalyst as disclosed in Japanese Patent Publication No.JP 2001205103. The dopants replace parts of oxygen ions in the $TiO_2$ crystals, implementing Ti—O—N bonding and inducing energy bands higher than the valence band of $TiO_2$, thereby lowering the bandgap of the nitrogen-doped $TiO_2$ photocatalyst to approximately 2.4 eV. Thus, the electrons of the nitrogen-doped $TiO_2$ photocatalyst can be excited by irradiation using light having approximately 520 nm wavelength of visible light to form electron-hole pairs.

However, $TiO_2$ photocatalyst has greater bandgap, sufficient to offer electron-hole pairs respectively with an electron in high reduction potential (−0.2 eV, when that of $H_2/H_2O$ is 0) and hole in high oxidation potential (+2.8 eV, when that of $H_2/H_2O$ is 0) after irradiation, thereby providing $TiO_2$ photocatalyst with high redox capability.

Although semiconductors with bandgap between 2.0 eV and 3.0 eV, such as GaP, GaAs, CdS, CdSe, $WO_3$, $Fe_2O_3$, metal-doped doped $TiO_2$, and nitrogen-doped $TiO_2$ can form electron-hole pairs therein after irradiation using visible light as photocatalysts, electron-hole pairs in metal-doped $TiO_2$, $WO_3$, and $Fe_2O_3$ respectively form a hole in high oxidation potential but electron in low reduction potential, and those in nitrogen-doped $TiO_2$, GaP, GaAs, CdS, and CdSe respective have an electron with high reduction potential but hole of low oxidation potential, resulting in the redox capabilities of the visible induced photocatalysts being worse than those of $TiO_2$ photocatalyst.

SUMMARY OF THE INVENTION

Thus, the main object of the present invention is to provide a photocatalyst generating electrons of high reduction potential and holes of high oxidation potential upon irradiation with visible light, in order to improve redox capabilities relative to the conventional visible induced photocatalysts.

In order to achieve the described object, the present invention provides a visible light induced, highly oxidative, and highly reductive photocatalyst having a first semiconductor with a bandgap between valence band and conduction band thereof between 2.0 eV to 3.0 eV, and second semiconductor, combined with the first semiconductor, with a bandgap between valence band and conduction band thereof between 2.0 eV to 3.0 eV. The conduction band of the first semiconductor is negative relative to that of $H_2/H_2O$ with a difference of 0.2 eV or greater. The valence band of the second semiconductor is positive relative to that of $H_2/H_2O$ with a difference of 2.8 eV or greater.

When the first semiconductor, such as nitrogen-doped $TiO_2$, carbon-doped $TiO_2$, GaP, GaAs, CdS, or CdSe, is irradiated by visible light, electrons with high reduction potential are generated. When the second semiconductor, such as metal-doped $TiO_2$, $WO_3$, or $Fe_2O_3$, is irradiated by visible light, holes with high oxidation potential are generated. Further, the metal doped in the metal-doped $TiO_2$ can be vanadium, chromium, manganese, or a combination thereof. The composite photocatalyst from the combination of the first and second semiconductors of the present invention can generate both electrons with high reduction potential and holes with high oxidation potential in one system, separate the electrons and holes instantaneously, and delay recombination of the electrons and holes, increasing probability of impact on the electrons/holes and adsorption molecules thereof after irradiation with visible light, thereby improving redox and future catalytic reaction capabilities thereof, relative to the conventional visible light-induced photocatalysts. Furthermore, the ratio of the first semiconductor to the second semiconductor in the composite is usually between 1 to 100 and 100 to 1, preferably between 1 to 2 and 2 to 1, and more preferably approximately 1 to 1.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following embodiments are intended to illustrate the invention more fully without limiting the scope of the claims, since numerous modifications and variations will be apparent to those skilled in this art.

In the subsequent embodiments, the visible light-induced photocatalysts of the present invention are placed in an aqueous solution of crystal violet ($C_{25}H_{30}ClN_3$), and should be catalyzed by the oxidation of holes. The subsequent Equation 1 shows the reaction of the solution of crystal violet in water, separated into $C_{25}H_{30}N_3^+$ and $Cl^-$ ions. In the subsequent Equation 2, $OH^-$ ions from the oxidation of water resulting from visible light irradiating the visible light-induced photocatalyst of the present invention react with the $C_{25}H_{30}ClN_3^+$ ions, forming transparent $C_{25}H_{30}N_3OH$, and thereby consuming the purple $C_{25}H_{30}ClN_3^+$ ions in order to show the outstanding redox capability of the visible light-induced photocatalysts of the present invention. However, the crystal violet will be not decomposed to smaller pieces necessarily.

(Eq. 1)

(Eq. 2)

Further, the visible light-induced photocatalysts of the second embodiment of the present invention are further placed in an aqueous solution of methylene blue ($C_{16}H_{18}ClN_3S$), and can be catalyzed by the reduction of electrons. Equation 3 shows the reaction of the solution of crystal violet in water, separating into $C_{16}H_{18}N_3S^+$ and $Cl^-$ ions. When the photocatalysts are irradiated by visible light, the excited electrons and holes therein react with $O_2$ and $H_2O$, generating $O_2^-$ and OH. free radicals or $HO_2$ and $OH^-$ radicals. These anions reduce the blue $C_{16}H_{18}N_3S^+$ ions, forming transparent $C_{16}H_{19}N_3S$ or $C_{16}H_{18}N_3SOH$, thereby consuming the $C_{16}H_{18}N_3S^+$ ions, showing the outstanding redox capability of the visible light-induced photocatalysts of the present invention.

(Eq. 3)

-continued (Eq. 4)

(Eq. 5)

First Embodiment

The visible light-induced photocatalyst of one embodiment of the present invention uses GaP as the first semiconductor and $WO_3$ as the second semiconductor. Crystal violet is used as a reagent in the first experimental example, first comparative example, and second comparative example in order to show the outstanding redox capability of this embodiment.

FIRST EXPERIMENTAL EXAMPLE

The first semiconductor, GaP, and second semiconductor, $WO_3$, were respectively ground into powder and then sieved with meshes of No. 400, respectively gathering the sieved GaP and $WO_3$ powder with diameter of 33 μm or less.

Approximately 100 ml of an aqueous solution of crystal violet of concentration approximately 20 mg/ml was provided, and 10 mg of the sieved GaP powder and 10 mg of the sieved $WO_3$ powder added thereto, followed by stirring at approximately 500 RPM for approximately 5 minutes in a darkroom, uniformly dispensing the photocatalyst of this embodiment in the solution.

Stirring continued at approximately 500 RPM to uniformly dispense the photocatalyst, followed by irradiation with a high pressure sodium lamp providing visible light with wavelength between 450 nm and 650 nm and illumination of approximately 50K luxes. 1 ml. of the solution was centrifuged at approximately 12,000 RPM, and measured and checked for concentration, when irradiated for 20, 40, 60, 90, 120, 180, 240, 300, and 360 minutes.

FIRST COMPARATIVE EXAMPLE

The first semiconductor, GaP, was ground into powder and then sieved with meshes of No.400, gathering the sieved GaP powder with diameter of 33 μm or less.

Approximately 100 ml of an aqueous solution of crystal violet of concentration approximately 20 mg/ml was provided, and 20 mg of the sieved GaP powder added thereto, followed by stirring at approximately 500 RPM for approximately 5 minutes in a darkroom, uniformly dispensing the first semiconductor in the solution.

Stirring continued at approximately 500 RPM to uniformly dispense the first semiconductor, followed by irradiation with a high pressure sodium lamp providing visible light of wavelength between 450 nm and 650 nm and illumination of approximately 50K luxes. 1 ml. of the solution was centrifuged at approximately 12,000 RPM, and measured and checked for concentration, when irradiated for 20, 40, 60, 90, 120, 180, 240, 300, and 360 minutes.

SECOND COMPARATIVE EXAMPLE

The second semiconductor, $WO_3$, was ground into powder and then sieved with meshes of No.400, gathering the sieved $WO_3$ powder with diameter of 33 μm or less.

Approximately 100 ml of an aqueous solution of crystal violet of concentration approximately 20 mg/ml was provided, and 20 mg of the sieved $WO_3$ powder added thereto, followed by stirring at approximately 500 RPM for approximately 5 minutes in a darkroom, uniformly dispensing the second semiconductor in the solution.

Stirring continued at approximately 500 RPM to uniformly dispense the second semiconductor, followed by irradiation with a high pressure sodium lamp providing visible light of wavelength between 450 nm and 650 nm and illumination of approximately 50K luxes. 1 ml. of the solution was centrifuged at approximately 12,000 RPM, and measured and checked for concentration, when irradiated for 20, 40, 60, 90, 120, 180, 240, 300, and 360 minutes.

Results

Figure 1:
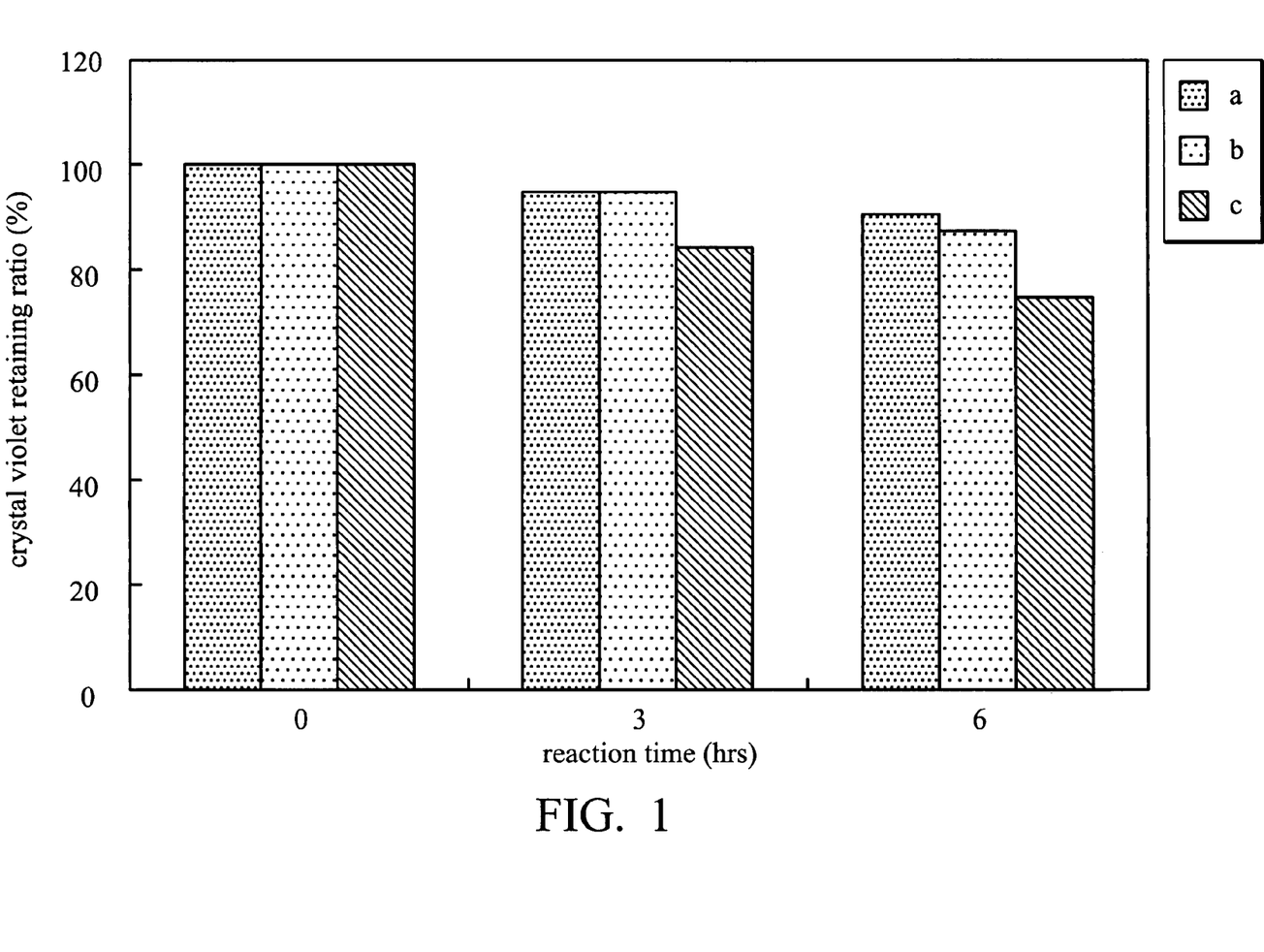
FIG. 1 is a comparative chart of results of a first experimental example, first comparative example, and second comparative example of one embodiment of the present invention.

Result data a, b, and c, respectively of the first comparative example, second comparative example, and first experimental example, are shown in FIG. 1, comparing the crystal violet retaining ratios at reaction time of 0, 3, and 6 hours (0, 180, and 360 minutes) using irradiation of high pressure sodium lamp. The data c, from the first experimental example photocatalyzing crystal violet using the photocatalyst of this embodiment under irradiation with the high pressure sodium lamp, shows only 84% and 74% of the crystal violet retaining in the solution, respectively when irradiated for 3 hours and 6 hours. The data a, from the first comparative example photocatalyzing crystal violet using the first semiconductor, generating electrons in high reduction potential under visible light, under irradiation with the high pressure sodium lamp, shows 94% and 90% of the crystal violet retaining in the solution, respectively when irradiated for 3 hours and 6 hours. The data b, from the second comparative example photocatalyzing crystal violet using the second semiconductor, generating holes in high oxidation potential under visible light, under irradiation with the high pressure sodium lamp, shows 94% and 86% of the crystal violet retaining in the solution, respectively when irradiated for 3 hours and 6 hours.

Thus, the results show efficacy of the inventive photocatalyst at improving redox capabilities relative to the conventional visible light-induced photocatalysts, thereby achieving the object of the present invention.

Second Embodiment

The visible light-induced photocatalyst of the second embodiment of the present invention uses nitrogen-doped $TiO_2$ as the first semiconductor and vanadium-doped $TiO_2$ as the second semiconductor.

First, the manufacturing method and properties of nitrogen-doped $TiO_2$ are described.

A solution of titanium n-butoxide ($Ti(OC_4H_9)_4$) has approximately 0.5 mole of alcohol added thereto, resulting in a molar ratio of alcohol/titanium of approximately 4, and is stirred using a magnetic stir reactor to mix uniformly. The mixture further receives approximately 0.5 mole of formic acid and is stirred for about 10 to 60 minutes. The alcohol dilutes the titanium n-butoxide, lowering the reaction rate of hydrolysis/condensation of the titanium n-butoxide. The formic acid reacts with the titanium n-butoxide, generating a new starting material, $Ti(OC_4H_9)_{4-x}(OAc)_x$, and thereby obtaining white titanium hydroxyl hydrate. The reaction rate of hydrolysis/condensation of the starting material can be controlled by homogenous water molecules generated by the esterification between alcohol and formic acid in order to obtain uniform titanium hydroxyl hydrate favorable to the subsequent peptization.

The titanium hydroxyl hydrate is centrifuged and added to an aqueous solution of nitric acid, stirred with a magnetic stir reactor, resulting in molar ratio of $HNO_3$/Ti between 0.5 and 2.0, with the acidolysis reaction of the titanium hydroxyl hydrate continued for approximately 8 hours, obtaining a transparent sol of titanium hydroxyl.

The transparent sol of titanium hydroxyl is dried for approximately 24 hours at approximately 50° C. in an oven, obtaining titanium hydroxyl solids. The titanium hydroxyl solids is heated to 150° C. at a heating rate of approximately 3° C./min., removing the solvent therefrom, and then calcined at between 300° C. and 500° C., obtaining abundant $TiO_2$ in anatase phase. The $TiO_2$ is ground into powder and then sieved with meshes of No.400, respectively gathering sieved $TiO_2$ powder with diameters of 33 μm or smaller. The grain sizes of the sieved $TiO_2$ powder measured by X-Ray diffraction are between 6 nm to 15 nm. The BET of the sieved $TiO_2$ powder are between 50 $m^2$/g to 80 $m^2$/g. The bandgap of the sieved $TiO_2$ powder measured by UV/VIS is approximately 3.2 eV.

The $TiO_2$ powders are sieved again with meshes of No. 400. The sieved $TiO_2$ powder are tempered in nitrogen atmosphere in a microwave plasma vacuum chamber under the recipes, with nitrogen flow rate approximately 20 sccm, vacuum level approximately 2 Torr, and microwave power between 100 W and 1000 W, for 1 to 6 hours, replacing parts of oxygen ions with the nitrogen ions, and thereby obtaining nitrogen-doped $TiO_2$ powder. The valence band of nitrogen is lower than that of oxygen, lowering the bandgap of the nitrogen-doped $TiO_2$ powder, thereby enabling the nitrogen-doped $TiO_2$ powder able to be excited by visible light. The grain sizes of the tempered nitrogen-doped $TiO_2$ powder measured by X-Ray diffraction are between 8 nm and 20 nm. The BET of the tempered nitrogen-doped $TiO_2$ powder are between 30 $m^2$/g and 60 $m^2$/g. The bandgap of the tempered nitrogen-doped $TiO_2$ powder measured by UV/VIS is between 2.8 eV and 3.0 eV.

The manufacturing method and properties of vanadium-doped $TiO_2$ powder of are now described.

A solution of titanium n-butoxide ($Ti(OC_4H_9)_4$) has approximately 0.5 mole of alcohol added thereto, resulting in a molar ratio of alcohol/titanium of approximately 4, and is stirred using a magnetic stir reactor to mix uniformly. Ammonium vanadate is previously dissolved in an aqueous solution of formic acid containing 0.5 mole of formic acid. The quantity of ammonium vanadate is controlled according to the molar ratio of vanadium/titanium between 0.001 and 0.005. The diluted titanium n-butoxide solution receives the aqueous solution of formic acid and ammonium vanadate and is stirred for about 10 to 60 minutes. The alcohol dilutes the titanium n-butoxide, lowering the reaction rate of hydrolysis/condensation of the titanium n-butoxide. The formic acid reacts with the titanium n-butoxide, generating a new starting material, $Ti(OC_4H_9)_{4-x}(OAc)_x$, and thereby obtaining orange titanium hydroxyl hydrate containing vanadium ions. The reaction rate of hydrolysis/condensation of the starting material can be controlled by homogenous water molecules generated by the esterification between alcohol and formic acid in order to obtain uniform titanium hydroxyl hydrate favorable to the subsequent peptization.

The titanium hydroxyl hydrate containing vanadium ions is centrifuged and added to an aqueous solution of nitric acid, stirred with a magnetic stir reactor, resulting in molar ratio of $HNO_3$/Ti between 0.5 and 2.0, with the acidolysis reaction of the titanium hydroxyl hydrate continued for approximately 8 hours, obtaining a transparent sol of titanium hydroxyl containing vanadium ions.

The transparent sol of titanium hydroxyl containing vanadium ions is dried for approximately 24 hours at approximately 50° C., obtaining titanium hydroxyl solids containing vanadium ions. The titanium hydroxyl solids containing vanadium ions is heated to 150° C. at approximately 3° C./min., removing the solvent therefrom, and then calcined at between 300° C. and 500° C., obtaining abundant vanadium-doped $TiO_2$ in anatase phase. The vanadium-doped $TiO_2$ was ground into powder and then sieved with meshes of No.400, respectively gathering the sieved vanadium-doped $TiO_2$ powder with diameter of 33 μm or less. The grain sizes of the sieved vanadium-doped $TiO_2$ powder measured by X-Ray diffraction are between 6 nm to 15 nm. The BET of the sieved vanadium-doped $TiO_2$ powder are between 50 $m^2$/g to 80 $m^2$/g. The bandgap of the sieved vanadium-doped $TiO_2$ powder measured by UV/VIS is between 2.0 eV and 2.5 eV.

The vanadium-doped $TiO_2$ powders are sieved again with meshes of No. 400 for use with subsequent examples.

Crystal violet is used as a reagent in the second through fourth experimental examples and third and fourth comparative examples to show the outstanding redox capability of the photocatalysts of this embodiment.

SECOND EXPERIMENTAL EXAMPLE

The sieved powder of the first semiconductor, nitrogen-doped $TiO_2$, and second semiconductor, vanadium-doped $TiO_2$, both exhibit diameters of 33 μm or less. Approximately 100 ml of an aqueous solution of crystal violet of concentration approximately 0.005 mg/ml was provided, and 10 mg of the sieved nitrogen-doped $TiO_2$ powder and 10 mg of the sieved vanadium-doped $TiO_2$ powder added thereto, followed by stirring at approximately 500 RPM for approximately 5 minutes in a darkroom, uniformly dispensing the photocatalyst of this embodiment in the solution.

Stirring continued at approximately 500 RPM to uniformly dispense the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for the concentration, when irradiated for 20, 40, 60, 90, 120, 180, 240, 300, and 360 minutes.

THIRD EXPERIMENTAL EXAMPLE

The sieved powder of the first semiconductor, nitrogen-doped $TiO_2$, and second semiconductor, vanadium-doped $TiO_2$, both exhibit diameters of 33 μm or less. Approximately 100 ml of an aqueous solution of crystal violet of concentration approximately 0.005 mg/ml was provided, and 6.7 mg of the sieved nitrogen-doped $TiO_2$ powder and 13.3 mg of the sieved vanadium-doped $TiO_2$ powder added thereto, followed by stirring at approximately 500 RPM for approximately 5 minutes in a darkroom, uniformly dispensing the photocatalyst of this embodiment in the solution. Note that the ratio of nitrogen-doped $TiO_2$/vanadium-doped $TiO_2$ is 1/2, and the total weight of the photocatalyst of this embodiment is still 20 mg.

Stirring continued at approximately 500 RPM to uniformly dispense the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

FOURTH EXPERIMENTAL EXAMPLE

The sieved powder of the first semiconductor, nitrogen-doped $TiO_2$, and second semiconductor, vanadium-doped $TiO_2$, both exhibit diameters of 33 μm or less. Approximately 100 ml of an aqueous solution of crystal violet of concentration approximately 0.005 mg/ml was provided, and 13.3 mg of the sieved nitrogen-doped $TiO_2$ powder and 6.7 mg of the sieved vanadium-doped $TiO_2$ powder added thereto, followed by stirring at approximately 500 RPM for approximately 5 minutes in a darkroom, uniformly dispensing the photocatalyst of this embodiment in the solution. Note that the ratio of nitrogen-doped $TiO_2$/vanadium-doped $TiO_2$ is 2/1, and the total weight of the photocatalyst of this embodiment is still 20 mg.

Stirring continued at approximately 500 RPM to uniformly dispense the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

THIRD COMPARATIVE EXAMPLE

The sieved powder of the first semiconductor, nitrogen-doped $TiO_2$, exhibits diameter of 33 μm or less. Approximately 100 ml of an aqueous solution of crystal violet of concentration approximately 0.005 mg/ml was provided, and 20 mg of the sieved nitrogen-doped $TiO_2$ powder added thereto, followed by stirring at approximately 500 RPM for approximately 5 minutes in a darkroom, uniformly dispensing the photocatalyst of this example in the solution.

Stirring continued at approximately 500 RPM to uniformly dispense the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

FOURTH COMPARATIVE EXAMPLE

The sieved powder of the first semiconductor, vanadium-doped $TiO_2$, exhibits diameter of 33 μm or less. Approximately 100 ml of an aqueous solution of crystal violet of concentration approximately 0.005 mg/ml was provided, and 20 mg of the sieved vanadium-doped $TiO_2$ powder added thereto, followed by stirring at approximately 500 RPM for approximately 5 minutes in a darkroom, uniformly dispensing the photocatalyst of this example in the solution.

Stirring continued at approximately 500 RPM to uniformly dispense the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

Results

Figure 2:
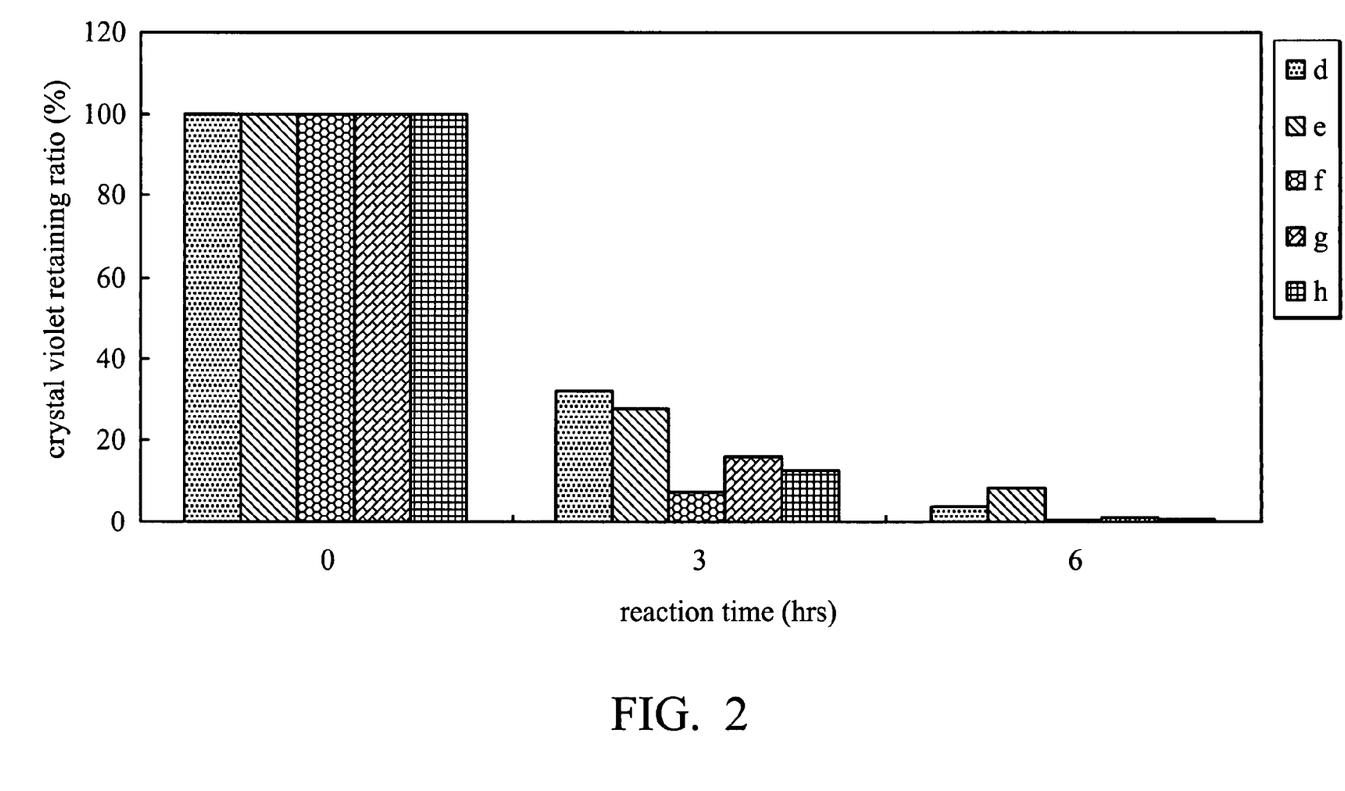
FIG. 2 is a comparative chart of results of a second experimental example, third experimental example, fourth experimental example, third comparative example, and fourth comparative example of a second embodiment of the present invention.

Result data d, e, f, g, and h, respectively of the third comparative example, fourth comparative example, second experimental example, third experimental example, and fourth experimental example, are shown in FIG. 2, comparing the crystal violet retaining ratios at reaction times of 0, 3, and 6 hours (0, 180, and 360 minutes) using irradiation from a high pressure sodium lamp. Data f through h, respectively from the second through fourth experimental examples photocatalyzing crystal violet using the photocatalyst of this embodiment with different ratios of highly oxidative nitrogen-doped $TiO_2$ and highly reductive vanadium-doped $TiO_2$ (1:1, 1:2, and 2:1), under high pressure sodium lamp, show respectively only 7.73%, 16.30%, and 12.84% of the crystal violet retained in the solution when irradiated for 3 hours, and 0.56%, 1.56%, and 0.78% of the crystal violet retained in the solution when irradiated for 6 hours. The data d, from the third comparative example photocatalyzing crystal violet using the first semiconductor, nitrogen-doped $TiO_2$, generating electrons of high reduction potential under visible light, under high pressure sodium lamp, show 32.12% and 4.23% of the crystal violet retaining in the solution, respectively when irradiated for 3 hours and 6 hours. The data e, from the fourth comparative example photocatalyzing crystal violet using the second semiconductor, vanadium-doped $TiO_2$, generating holes in high oxidation potential under visible light, under irradiation of the high pressure sodium lamp, show 27.92% and 8.78% of the crystal violet retaining in the solution, respectively when irradiated for 3 hours and 6 hours.

Thus, the results show efficacy of the inventive photocatalyst improving the redox capabilities relative to the conventional visible induced photocatalysts, thereby achieving the object of the present invention.

Further, methylene blue is used as a reagent in the subsequent fifth through seventh experimental examples and fifth and sixth comparative examples in order to further show the outstanding redox capability of the visible light-induced photocatalysts of this embodiment.

FIFTH EXPERIMENTAL EXAMPLE

The sieved powder of the first semiconductor, nitrogen-doped $TiO_2$, and second semiconductor, vanadium-doped $TiO_2$, both exhibit diameters of 33 μm or less. Approximately 100 ml of an aqueous solution of methylene blue of concentration approximately 0.01 mg/ml was provided, and 10 mg of the sieved nitrogen-doped $TiO_2$ powder and 10 mg of the sieved vanadium-doped $TiO_2$ powder added thereto, followed by stirring at approximately 500 RPM for approximately 5 minutes in a darkroom, uniformly dispensing the photocatalyst of this embodiment in the solution.

Stirring continued at approximately 500 RPM to uniformly disperse the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked concentration, when irradiated for 20, 40, 60, 90, 120, 180, 240, 300, and 360 minutes.

SIXTH EXPERIMENTAL EXAMPLE

The sieved powder of the first semiconductor, nitrogen-doped $TiO_2$, and second semiconductor, vanadium-doped $TiO_2$, both exhibit diameters of 33 µm or less. Approximately 100 ml of an aqueous solution of methylene blue of concentration approximately 0.01 mg/ml was provided, and 6.7 mg of the sieved nitrogen-doped $TiO_2$ powder and 13.3 mg of the sieved vanadium-doped $TiO_2$ powder added thereto, followed by stirring at approximately 500 RPM for approximately 5 minutes in a darkroom, uniformly dispensing the photocatalyst of this embodiment in the solution. Note that the ratio of nitrogen-doped $TiO_2$/vanadium-doped $TiO_2$ is 1/2, and the total weight of the photocatalyst of this embodiment is still 20 mg.

Stirring continued at approximately 500 RPM to uniformly disperse the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

SEVENTH EXPERIMENTAL EXAMPLE

The sieved powder of the first semiconductor, nitrogen-doped $TiO_2$, and second semiconductor, vanadium-doped $TiO_2$, both exhibit diameters of 33 µm or less. Approximately 100 ml of an aqueous solution of methylene blue of concentration approximately 0.01 mg/ml was provided, and 13.3 mg of the sieved nitrogen-doped $TiO_2$ powder and 6.7 mg of the sieved vanadium-doped $TiO_2$ powder added thereto, followed by stirring at approximately 500 RPM for approximately 5 minutes in a darkroom, uniformly dispensing the photocatalyst of this embodiment in the solution. Note that the ratio of nitrogen-doped $TiO_2$/vanadium-doped $TiO_2$ is 2/1, and the total weight of the photocatalyst of this embodiment is still 20 mg.

Stirring continued at approximately 500 RPM to uniformly disperse the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

FIFTH COMPARATIVE EXAMPLE

The sieved powder of the first semiconductor, nitrogen-doped $TiO_2$, exhibits diameter of 33 µm or less. Approximately 100 ml of an aqueous solution of methylene blue of concentration approximately 0.01 mg/ml was provided, and 20 mg of the sieved nitrogen-doped $TiO_2$ powder added thereto, followed by stirring at approximately 500 RPM for approximately 5 minutes in a darkroom, uniformly dispensing the photocatalyst of this example in the solution.

Stirring continued at approximately 500 RPM to uniformly disperse the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

SIXTH COMPARATIVE EXAMPLE

The sieved powder of the first semiconductor, vanadium-doped $TiO_2$, exhibits diameter of 33 µm or less. Approximately 100 ml of an aqueous solution of methylene blue of concentration approximately 0.01 mg/ml and was provided, and 20 mg of the sieved vanadium-doped $TiO_2$ powder added thereto, followed by stirring at approximately 500 RPM for approximately 5 minutes in a darkroom, uniformly dispensing the photocatalyst of this example in the solution.

Stirring continued at approximately 500 RPM to uniformly disperse the photocatalyst, followed by irradiation with a high pressure sodium lamp providing visible light of wavelength between 450 nm and 650 nm and illumination of approximately 50K luxes, in a constant temperature bath at approximately 25° C. 1 ml. of the solution was centrifuged at approximately 12,000 RPM, and measured and checked for concentration, when irradiated for 20, 40, 60, 90, 120, 180, 240, 300, and 360 minutes.

Results

Figure 3:
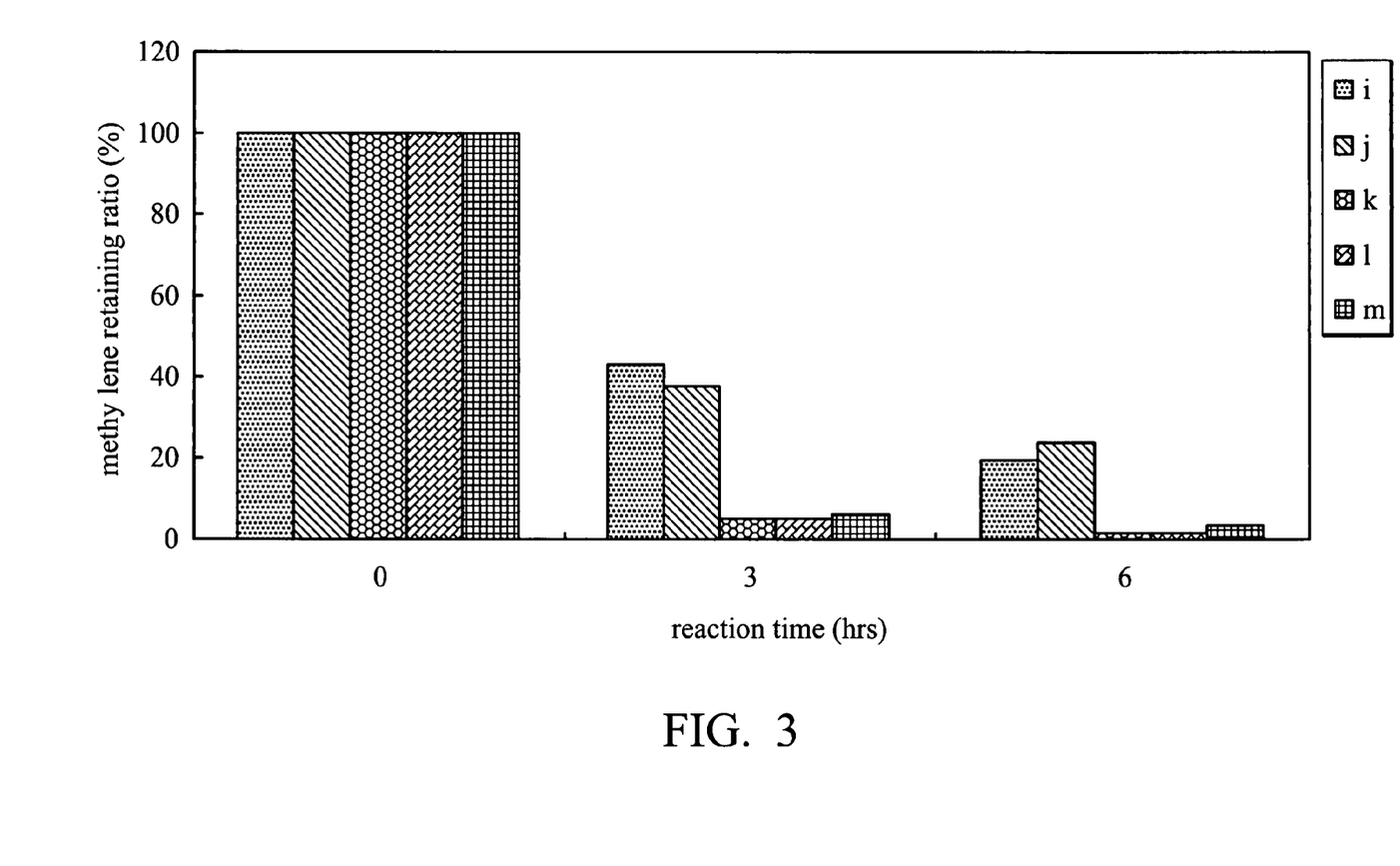
FIG. 3 is a comparative chart of results of a fifth experimental example, sixth experimental example, seventh experimental example, fifth comparative example, and sixth comparative example of a second embodiment of the present invention.

Result data i, j, k, l, and m, respectively of the fifth comparative example, sixth comparative example, fifth experimental example, sixth experimental example, and seventh experimental example, are shown in FIG. 3, comparing the methylene blue retaining ratios at reaction times of 0, 3, and 6 hours (0, 180, and 360 minutes) using irradiation from a high pressure sodium lamp. Data k through m, respectively from the fifth through seventh experimental examples photocatalyzing methylene blue using the photocatalyst of this embodiment with different ratios of highly oxidative nitrogen-doped $TiO_2$ and highly reductive vanadium-doped $TiO_2$ (1:1, 1:2, and 2:1), under high pressure sodium lamp, show respectively only 4.58%, 4.67%, and 5.83% of the methylene retained in the solution when irradiated for 3 hours, and 1.38%, 1.39%, and 3.27% of the methylene blue retained in the solution when irradiated for 6 hours. The data i, from the fifth comparative example photocatalyzing methylene blue using the first semiconductor, nitrogen-doped $TiO_2$, generating electrons of high reduction potential under visible light, under high pressure sodium lamp, show 43.07% and 19.34% of the methylene retained in the solution, respectively when irradiated for 3 hours and 6 hours. The data j, from the sixth comparative example photocatalyzing methylene blue using the second semiconductor, vanadium-doped $TiO_2$, generating holes in high oxidation potential under visible light, under irradiation of the high pressure sodium lamp, show 37.53% and 23.95% of the methylene blue retaining in the solution, respectively when irradiated for 3 hours and 6 hours.

Thus, the results show efficacy of the inventive photocatalyst improving the redox capabilities relative to the conventional visible induced photocatalysts, thereby achieving the object of the present invention.

Note that the photocatalysts of the first and second embodiment of the present invention are examples, and are not intended to limit the scope of the present invention. Those skilled in the art will recognize the possibility of using the first semiconductor, such as GaP, GaAs, CdS, CdSe, nitrogen-doped $TiO_2$, carbon-doped $TiO_2$, or combination thereof, to generate electrons of high reduction potential under irradiation of visible light, combined with the second semiconductor, such as $WO_3$, $Fe_2O_3$, metal-doped $TiO_2$, or a combination thereof, generating holes in high oxidation potential under visible light, with any possible ratio, such as between 1 to 100 and 100 to 1, to obtain the visible light induced, highly oxidative, and highly reductive photocatalyst of the present invention. Further, the metal can be vanadium, chromium, manganese, or combination thereof doped in the metal-doped $TiO_2$.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. A visible light-induced photocatalyst, comprising:
    a first semiconductor with a bandgap between valence band and conduction band thereof between 2.0 eV to 3.0 eV, the conduction band thereof being negative relative to that of $H_2/H_2O$ with a difference of 0.2 eV or greater; and
    a second semiconductor, combined with the first semiconductor, with a bandgap between valence band and conduction band thereof between 2.0 eV to 3.0 eV, the valence band thereof being positive relative to that of $H_2/H_2O$ with a difference of 2.8 eV or greater.

2. The photocatalyst as claimed in claim 1, wherein the first semiconductor is a powder with diameter of 33 μm or lower.

3. The photocatalyst as claimed in claim 1, wherein the second semiconductor is a powder with diameter of 33 μm or lower.

4. The photocatalyst as claimed in claim 1, wherein the ratio of the first semiconductor to the second semiconductor is approximately 1 to 1.

5. The photocatalyst as claimed in claim 1, wherein the ratio of the first semiconductor to the second semiconductor is between 1 to 2 and 2 to 1.

6. The photocatalyst as claimed in claim 1, wherein the ratio of the first semiconductor to the second semiconductor is between 1 to 100 and 100 to 1.

7. The photocatalyst as claimed in claim 1, wherein the first semiconductor is GaP.

8. The photocatalyst as claimed in claim 1, wherein the second semiconductor is $WO_3$.

9. The photocatalyst as claimed in claim 1, wherein the first semiconductor is nitrogen-doped $TiO_2$, or carbon-doped $TiO_2$.

10. The photocatalyst as claimed in claim 1, wherein the second semiconductor is vanadium-doped $TiO_2$.

11. The photocatalyst as claimed in claim 1, wherein the second semiconductor is metal-doped $TiO_2$.

12. The method as claimed in claim 11, wherein the metal is vanadium, chromium, manganese, or combination thereof.

13. The photocatalyst as claimed in claim 1, wherein the first semiconductor is GaP, GaAs, CdS, CdSe, nitrogen-doped $TiO_2$, carbon-doped $TiO_2$ or a combination thereof.

14. The photocatalyst as claimed in claim 1, wherein the second semiconductor is $WO_3$, $Fe_2O_3$, metal-doped $TiO_2$, or combination thereof.

15. The method as claimed in claim 14, wherein the metal is vanadium, chromium, manganese, or a combination thereof.

16. A visible light-induced photocatalyst, comprising:
    nitrogen-doped $TiO_2$ with a bandgap between valence band and conduction band thereof between 2.0 eV to 3.0 eV, the conduction band thereof being negative relative to that of $H_2/H_2O$ with a difference of 0.2 eV or greater; and
    vanadium-doped $TiO_2$, combined with the nitrogen-doped $TiO_2$, with a bandgap between valence band and conduction band thereof between 2.0 eV to 3.0 eV, the valence band thereof being positive relative to that of $H_2/H_2O$ with a difference of 2.8 eV or greater.

17. The photocatalyst as claimed in claim 16, wherein the nitrogen-doped $TiO_2$ is a powder with diameter of 33 μm or lower.

18. The photocatalyst as claimed in claim 16, wherein the vanadium-doped $TiO_2$ is a powder with diameter of 33 μm or lower.

19. The photocatalyst as claimed in claim 16, wherein the ratio of the nitrogen-doped $TiO_2$ to the vanadium-doped $TiO_2$ is between 1 to 2 and 2 to 1.

20. The photocatalyst as claimed in claim 16, wherein the ratio of the nitrogen-doped $TiO_2$ to the vanadium-doped $TiO_2$ is between 1 to 100 and 100 to 1.

* * * * *

UNITED STATES PATENT AND TRADEMARK OFFICE
CERTIFICATE OF CORRECTION

| | | |
|---|---|---|
| PATENT NO. | : 7,169,733 B2 | |
| APPLICATION NO. | : 10/747463 | |
| DATED | : January 30, 2007 | |
| INVENTOR(S) | : Chih-Kuang Wang et al. | |

It is certified that error appears in the above-identified patent and that said Letters Patent is hereby corrected as shown below:

Title Page
item (30) should read:

-- Dec. 31, 2002  (TW) ....................................... 91 1 38096
   Nov. 5, 2003   (TW) ....................................... 92 1 30897--

Signed and Sealed this

Tenth Day of April, 2007

JON W. DUDAS
*Director of the United States Patent and Trademark Office*